United States Patent
Markovitz (10) Patent No.: US 9,924,239 B2
(45) Date of Patent: Mar. 20, 2018

(54) VIDEO ON DEMAND OVER SATELLITE

(71) Applicant: Gilat Satellite Networks Ltd., Petah Tikva (IL)

(72) Inventor: Oren Markovitz, Raanana (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 0 days.

(21) Appl. No.: 14/731,332

(22) Filed: Jun. 4, 2015

(65) Prior Publication Data

US 2015/0358692 A1    Dec. 10, 2015

Related U.S. Application Data

(60) Provisional application No. 62/010,031, filed on Jun. 10, 2014.

(51) Int. Cl.

| | | |
|---|---|---|
| *H04N 7/173* | (2011.01) | |
| *H04N 21/845* | (2011.01) | |
| *H04N 21/235* | (2011.01) | |
| *H04N 21/231* | (2011.01) | |
| *H04N 21/61* | (2011.01) | |
| *H04N 21/6405* | (2011.01) | |

(52) U.S. Cl.
CPC ....... *H04N 21/8456* (2013.01); *H04N 21/231* (2013.01); *H04N 21/2353* (2013.01); *H04N 21/6143* (2013.01); *H04N 21/6405* (2013.01)

(58) Field of Classification Search
CPC ......... H04N 21/4384; H04N 21/64322; H04N 21/2662; H04N 21/6125; H04N 21/2385; H04N 21/4302; H04N 21/2183; H04N 21/85406; H04N 21/8456; H04N 21/231; H04N 21/6405; H04N 21/6143; H04N 21/2353
USPC ........................................................ 725/109
See application file for complete search history.

(56) References Cited

U.S. PATENT DOCUMENTS

| | | | | |
|---|---|---|---|---|
| 8,365,229 B2 * | 1/2013 | Song | .................. | H04N 21/2353 |
| | | | | 725/118 |
| 8,572,658 B2 * | 10/2013 | Song | .................. | H04N 21/2353 |
| | | | | 725/115 |
| 8,948,249 B2 * | 2/2015 | Sun | .................... | H04N 21/2343 |
| | | | | 375/240.01 |
| 2006/0031889 A1 * | 2/2006 | Bennett | ............. | H04L 29/06027 |
| | | | | 725/80 |
| 2006/0230176 A1 * | 10/2006 | Dacosta | ............ | H04L 29/06027 |
| | | | | 709/235 |
| 2009/0172742 A1 * | 7/2009 | Weaver | .............. | H04N 7/17318 |
| | | | | 725/58 |
| 2010/0058405 A1 * | 3/2010 | Ramakrishnan | ... | H04N 7/17318 |
| | | | | 725/97 |
| 2010/0161756 A1 * | 6/2010 | Lewis | ................ | H04N 7/17318 |
| | | | | 709/217 |
| 2011/0188439 A1 * | 8/2011 | Mao | .................... | H04N 7/17318 |
| | | | | 370/312 |

(Continued)

*Primary Examiner* — Michael B Pierorazio
(74) *Attorney, Agent, or Firm* — Banner & Witcoff, Ltd.

(57) ABSTRACT

Consumption habits of video content have been changing for some time, as more people (especially young people) prefer video on demand (VOD) services over linear channels. Disclosed is a communication system configured to efficiently deliver video content on demand over a satellite medium. Also disclosed are methods for efficiently delivering video content on demand using multicast transmissions and caching of video title prefixes.

12 Claims, 3 Drawing Sheets

(56) References Cited

U.S. PATENT DOCUMENTS

| | | | |
|---|---|---|---|
| 2012/0117103 A1* | 5/2012 | Farrelly | G06F 17/30091 |
| | | | 707/769 |
| 2013/0132986 A1* | 5/2013 | Mack | H04L 65/605 |
| | | | 725/14 |
| 2013/0133009 A1* | 5/2013 | Bhogal | H04N 21/4436 |
| | | | 725/58 |
| 2014/0282761 A1* | 9/2014 | Bjordammen | H04N 21/231 |
| | | | 725/92 |
| 2014/0282762 A1* | 9/2014 | Bjordammen | H04N 21/4667 |
| | | | 725/92 |
| 2014/0282777 A1* | 9/2014 | Gonder | H04L 65/605 |
| | | | 725/109 |

* cited by examiner

VIDEO ON DEMAND OVER SATELLITE

PRIORITY CLAIM

This application claims priority to U.S. Provisional Patent Application Ser. No. 62/010,031, filed Jun. 10, 2014, and entitled "Video on Demand over Satellite," the disclosure of which is incorporated by reference herein in its entirety and made part hereof.

FIELD

Aspects of the disclosure pertain to the field of content distribution in general and to distribution of video content over satellite communication systems in particular.

BACKGROUND

People's habits concerning consumption of video content (titles, e.g., movies, television programs, episodes, etc.) have been changing for some time. Traditionally, linear (regular) channels containing video content were and still are broadcasted (usually by Pay-TV operators) over satellites and over cables to many millions of end users, wherein to watch a certain title an end-user has to watch the title at the time it is transmitted (or record the content at the time it is transmitted e.g., for subsequent viewing). In recent years, linear television service providers (Pay-TV operators) have been responding to a trend led by the young generations and have been offering Video on Demand (VOD) services, which allow end users to watch content of their choice (out of libraries containing thousands of titles) at times of their choosing. In addition, with broadband Internet services becoming widely available and affordable, VOD services are also provided over the Internet by Internet VOD service providers (sometimes also referred to as Over the Top (OTT) VOD providers). Satellite Pay-TV operators (also referred to as Direct to Home (DTH) services) use hybrid set-top-boxes (STBs). These STBs allow DTH users to watch linear television channels (broadcasted over a satellite), access a relatively small selection of titles stored in their STBs (broadcasted over the satellite (Push VOD)), and to download titles over terrestrial broadband Internet links (IP VOD or OTT VOD).

Known technologies for delivering Video on Demand (VOD) services can be classified into three major classes:

(1) Near VOD: In order to allow an end user to watch a title at almost any time of his or her choosing (also sometimes referred to as Pay per View (PPV)), the service provider continuously broadcasts multiple copies of the title with short time offsets between the copies (typically 10-20 minutes, depending on the overall length of the title). That way, the end user needs to wait only a few minutes until they can get content of their choosing. Even though a short delay could be experienced until the content of choice is delivered, many would still consider such a service convenient. Technologies of this type are often limited to providing access to a relatively small number of titles, mainly due to their utilizing substantial bandwidth. These technologies do, however, still utilize far less bandwidth than needed for an on demand service.

(2) Push VOD: The technologies in this category make use of a personal video recorder (PVR), usually installed at the end user's premises, for storing selected content. The selected content (usually content which is likely to be of interest to many end users) is often broadcast either overnight using spare capacity (or at other times when the media is not entirely utilized for other services) or all day long but at a low rate (to consume relatively little capacity or bandwidth). While such technologies are quite efficient in terms of bandwidth, to provide good user experience the service provider needs to push and store large volumes of content (hundreds of Gigabytes to several Terabytes) to the end user's PVRs. To store such high volumes of content, the PVRs need to be equipped with storage means suitable for storing very high volumes, which could make such PVRs relatively expensive.

(3) On Demand: Each end user has a set-top-box (STB) that usually receives broadcasts of linear channels and streams the selected channel to the end user's screen. When content is requested on demand, the STB establishes a unicast session with the VOD provider's server (usually over a broadband Internet link), downloads the requested content from the VOD provider's server, stores it in local storage and then streams it to the end user's screen. Since each transmission is received by a single end user (e.g., due to the content being transmitted using a unicast service), the number of times a title is transmitted equals the number of times it is requested, i.e., the more users there are, the more bandwidth they consume. Thus, the main problem with these types of technologies is that they utilize huge amounts of capacity (e.g., bandwidth). In 2013, VOD services Netflix (https://www.netflix.com/) and YouTube (http://www.youtube.com/) generated half the overall peak-hour Internet traffic in the U.S. Netflix subscribers alone were responsible for about one third of the overall peak-hour Internet traffic in the U.S., generating some 7 million sessions.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some aspects of the disclosure in a simplified form as a prelude to the description below.

In accordance with aspects of the disclose, a communication system may comprise a hub and a plurality of user subsystems. The hub may be coupled to and/or comprise at least one content server that may be configured to at least store video content. At least one user subsystem of the plurality of user subsystems may comprise a terminal and at least one video client coupled to the terminal, wherein the terminal of the at least one user subsystem may have local storage means. The hub of the communication system may be configured to transmit a forward channel via at least one satellite, and the terminal included in the at least one user subsystem may be configured to receive the forward channel via the at least one satellite, wherein the forward channel may be configured to carry at least one or more video channels. The communication system may comprise a return channel configured for allowing the terminal of the at least one user subsystem to transmit information to, and possibly receive information from, the hub.

In some embodiments, the disclosed communication system may be configured to deliver video content on demand, for example, from the at least one content server to the at least one video client, wherein delivering the video content may comprise efficiently distributing the video content using one or more multicast transmissions over the forward channel and storing video content at a storage that may be associated with the terminal of the at least one user subsystem.

In some embodiments, the hub of the communication system may be configured to divide video content associated with a title into one or more segments, generate a title prefix corresponding to the title, for example, from some of the one or more segment(s) of video content associated with the title, and distribute the at least one title prefix over the forward channel to the plurality of user subsystems. The terminal of the at least one user subsystem may be configured to receive the one or more multicast transmissions, extract one or more title prefixes distributed in the one or more multicast transmissions, and store the extracted one or more title prefixes in the local storage associated with the terminal.

In some embodiments, the terminal may be configured to, upon detecting a user request for a title, send to the hub (e.g., via the return channel) a video on demand (VOD) request for the selected title. The terminal may be configured to determine if a title prefix corresponding to the selected title is stored in the local storage associated with the terminal and to start streaming the title prefix corresponding to the selected title to the at least one video client if the title prefix is stored in the local storage. Thus, the disclosed communication system may provide excellent user experience (e.g., similar to linear channels). For example, a user may begin watching a selected title almost immediately after requesting the title, e.g., as no buffering of video content may be needed, and without being affected by any latency that may exist between the user's subsystem and the hub, between the hub and the at least one content server, or at the at least one content server itself (e.g., due to high demand).

In some embodiments, the hub may be configured to, upon receiving a VOD request for a selected title, determine which one or more segments of video content (if any) associated with the selected title to transmit over the forward channel. In some embodiments, the hub may be configured not to transmit segments of video content included in a title prefix associated with the selected title. The hub may be further configured to transmit the determined segments of video content (if any) using one or more multicast transmissions. The terminal of the at least one user subsystem may be configured to, upon sending a VOD request for a selected title, receive the one or more multicast transmissions including video content associated with the selected title, store the received video content in the local storage associated with the terminal, and stream the received video content to the at least one video client. The terminal may be further configured to start streaming the received video content about immediately after the title prefix associated with the selected title has been streamed to the at least one video client.

In some embodiments, the hub may be configured to transmit each segment of video content, e.g., that needs to be transmitted, as late as possible, e.g., to delay transmission of segments of video content as much as possible so that each segment of video content may be received by the terminal just in time for streaming the video content to the at least one video client, without affecting the end user's viewing experience.

In some embodiments, the hub may be configured to determine, upon receiving a VOD request for a selected title, that the selected title has already been requested (e.g., by another user subsystem), modify a previous determination of which segments of video content associated with the selected title to transmit, and transmit segments of video content associated with the selected title in accordance with the modified determination. In some embodiments, the hub may be configured to, upon receiving a first VOD request for a selected title, start transmitting a first transmission session comprising one or more segments of video content associated with the selected title. The hub may be further configured to, upon receiving a subsequent VOD request for the selected title, determine that one or more transmission sessions associated with the selected title are in progress, determine that at least one segment of video content associated with the selected title is no longer being transmitted in any of the one or more in-progress transmission sessions, and generate a new transmission session associated with the selected title, wherein the newly generated transmission session may include said at least one segment of video content.

BRIEF DESCRIPTION OF THE DRAWINGS

Having thus described the disclosure in general terms, reference will now be made to the accompanying drawings, which are not necessarily drawn to scale, and wherein:

DETAILED DESCRIPTION

Figure 1:
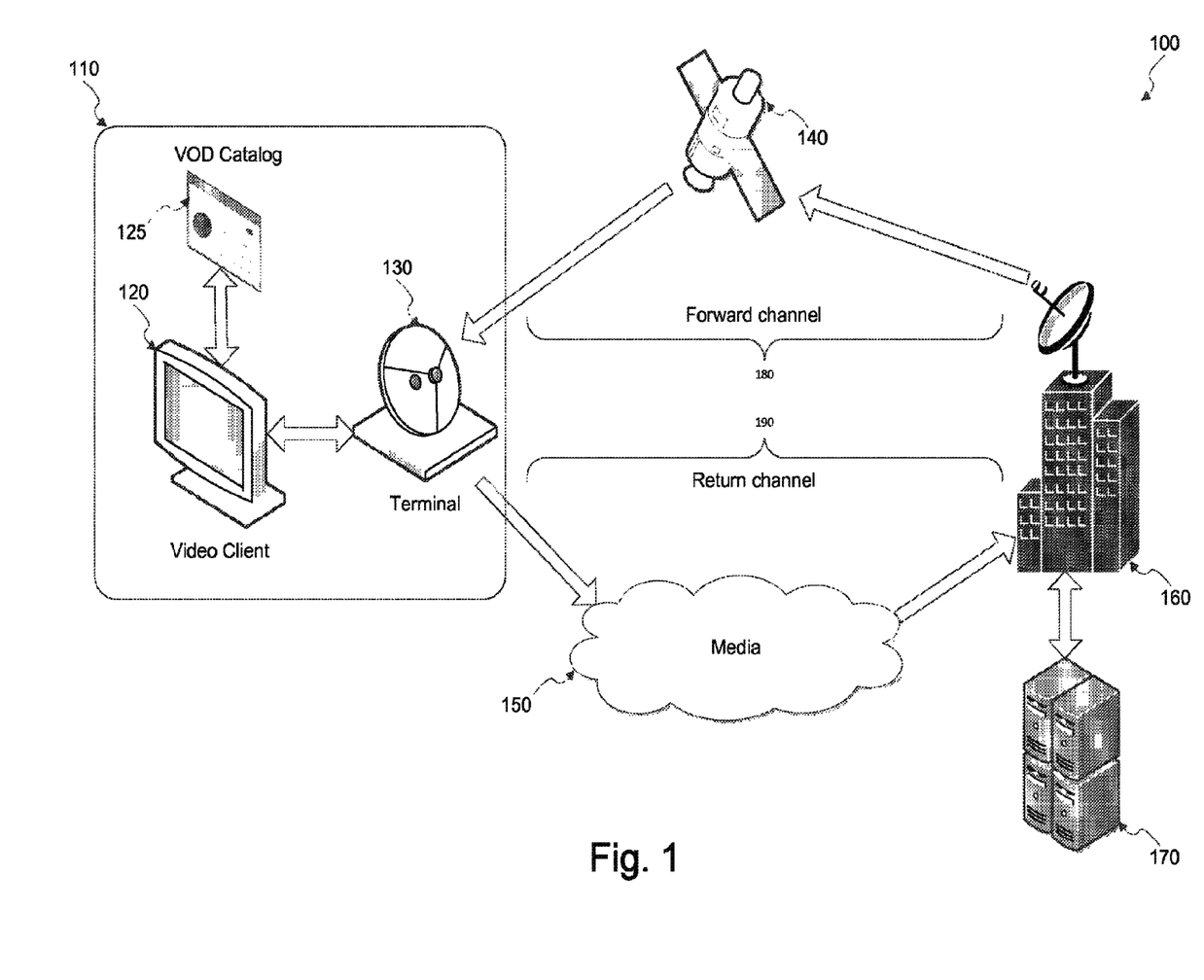
FIG. 1 shows an example of a Video on Demand delivery system in accordance with one or more aspects of the disclosure.

Referring to FIG. 1, system 100 may be configured to deliver video content on demand from at least one content server to at least one user subsystem. System 100 may comprise one or more content servers (170) configured to at least store video content, and a hub (160). The hub (160) may be configured to transmit a forward channel (180) via at least one satellite (140), wherein the forward channel (180) may be configured to carry at least one or more video channels. In some embodiments, the one or more content servers (170) may be coupled with the hub (160) using communication means that may be configured to at least deliver video content from the one or more content servers (170) to the hub (160). In some embodiments, the one or more content servers (170) may be co-located with the hub (160) or included in the hub (160).

System 100 may further comprise one or more user subsystems (110). A user subsystem (110) may comprise at least one video client (120) (such as but not limited to a television set, a home theater system, a personal computer, a portable computer, a tablet computer, a smartphone, or any other device that may be used for consuming video content) and a terminal (130) to which the at least one video client may be coupled (e.g., via a wired or wireless connection). In some embodiments, the terminal (130) may comprise a very small aperture terminal (VSAT). In some embodiments, the terminal (130) may comprise a set-top-box device (STB). The terminal (130) (or the STB that may be included in the terminal (130)) may be configured to receive the forward channel (180) transmitted by the hub (160) via the at least one satellite (140), extract from the received forward channel (180) at least one video channel of the one or more video channels, and transmit the at least one video channel extracted from the forward channel (180) to the at least one video client (120). In some embodiments, the terminal (130) may be configured to transmit the at least one video channel to the at least one video client (120) in accordance with and/or using one or more formats, protocols and/or interfaces (e.g., that the video client (120) may be configured to support), for example, high definition multimedia interface (HDMI), audit video interface (A/V), MPEG frames, MPEG frames encapsulated in IP packets, IP datagrams (e.g., using real-time transport protocol (RTP)), etc.

In addition, system 100 may further comprise a return channel (190) over a media (150), wherein the return channel (190) may be configured to allow user subsystems (110) or terminals (130) to communicate with the hub (160) and/or the one or more content servers (170). In some embodiments, communication between user subsystems (110) and the hub (160) and/or the one or more content servers (170) may be done over one or more private networks, public networks, for example, the Internet, or a combination thereof. In some embodiments, the media (150) carrying the return channel (190) may comprise a satellite link, for example, via the at least one satellite (140), that may also be used for delivering the forward channel (180). In some embodiments, the media (150) carrying the return channel (190) may comprise a terrestrial wireless link (for example, a cellular link), and the terminal (130) may be configured to comprise or may be configured to be coupled to a device (e.g., a cellular modem) configured to receive and/or transmit data over a terrestrial wireless network (e.g., a cellular network). In some embodiments, the media (150) carrying the return channel (190) may comprise a wired link (for example, a digital subscriber line (DSL)). It will be appreciated by those skilled in the art, that return channel (190) may be realized in many ways without departing from the scope of the present disclosure, for example, using one or more types of media out of a variety of media types, using any combination of private networks and public networks, and using any combination of one or more communication protocols.

In accordance with aspects of the disclosure, system 100 may be configured to deliver video content on demand, for example, from the one or more content servers (170) to a video client (120) in a user subsystem (110).

The hub (160) may be configured to generate a title prefix for at least one title stored in the one or more content servers (170). The hub (160) may be configured to divide video content associated with a title into one or more segments and generate a title prefix corresponding to the title, for example, from one or more of the segment(s) of video content associated with the title (e.g., the first few segments). Hub (160) may be further configured to use one or more multicast transmissions over the forward channel (180) for at least the purpose of distributing at least one title prefix corresponding to at least one title deliverable on demand to the one or more user subsystems (110). In some embodiments, the hub (160) may be configured to distribute multiple title prefixes corresponding to multiple titles deliverable on demand to the one or more user subsystems (110). In some embodiments, the hub (160) may be configured to distribute a title prefix for each title deliverable on demand to the one or more user subsystems (110).

Terminal (130) of at least one of the one or more user subsystems (110) may be configured to receive the one or more multicast transmissions, extract one or more title prefixes distributed in the one or more multicast transmissions, and store the extracted one or more title prefixes in a local storage. In some embodiments, the local storage may comprise any of one or more volatile or non-volatile memory devices. For example, the one or more non-volatile memory devices may comprise solid-state memory device(s) (e.g., secure digital (SD) memory devices) and/or hard-disk drive(s) (HDDs).

The amount of local storage associated with the terminal (130) may be limited, and increasing the amount of local storage may lead to an increase in the cost of the terminal (130). Thus, in some embodiments, at least for the purpose of enabling a reduction in the amount or volume of storage that may be utilized by the terminal (130), the terminal (130) may be configured to remove (delete) one or more title prefixes from the local storage. In some embodiments, the terminal (130) may be configured to remove a title prefix from the local storage if the title prefix has been stored in the local storage for more than a predefined duration of time (e.g., since the likelihood of the title being requested may decrease over time) and/or if more than a predefined duration of time has elapsed since the last time the title was requested. In some embodiments, the hub (160) may be configured to send and/or the terminal (130) may be configured to receive one or more commands to remove one or more title prefixes from the local storage, and the terminal (130) may be configured to remove the one or more title prefixes from the local storage upon receiving said one or more commands.

In some embodiments, for at least the purpose of reducing an amount of bandwidth that may be needed for a video on demand (VOD) service, the hub (160) may be configured to determine a length of each title prefix and distribute each title prefix in accordance with the determined title prefix length. In some embodiments, all the title prefixes that may be distributed may be of the same length, for example, all the title prefixes may comprise the same number of video content segments, wherein all video content segments may be of the same length (for example, measured in playing time (e.g., minutes, seconds, etc.) and/or storage space (e.g., Kilobytes, Megabytes, Gigabytes, etc.)). In some embodiments, title prefixes that may be distributed may differ in length, for example, different title prefixes may comprise any of the same number of video content segments or different numbers of video content segments, and the video content segments may be of the same length or different lengths. In some embodiments, the hub (160) may be configured to determine a length of a title prefix in accordance with the title length, for example, a title prefix associated with a long title (e.g., in terms of playing time and/or needed storage space) may be longer than a title prefix associated with a shorter title. In some embodiments, the hub (160) may be configured to determine a length of a title prefix in accordance with a popularity figure that may be associated with the title, or in accordance with determining a sufficiently high likelihood that the title will be requested more than a predetermined or predefined number of times. In such embodiments, determining said likelihood may comprise collecting statistics over a period of time and/or receiving a predefined list of titles (e.g., from a system operator). In such embodiments, the more popular a title may be, the longer the distributed title prefix may be. In some embodiments, the hub (160) may be configured to determine a cost figure corresponding to a cost of storing a title prefix (e.g., of a predefined length) in a storage associated with a terminal (130) of at least one of the one or more user subsystems (110), a cost figure corresponding to the cost of an amount of satellite bandwidth needed for distributing a title prefix (e.g., of a predefined length), and/or a length property for the title prefix in accordance with one or more of the determined cost figures. In some embodiments, the hub (160) may be configured to determine, for example in accordance with one or more attributes of a title (e.g., a title length, a popularity figure associated with the title, or the like) and/or one or more of the determined cost figures, that a title prefix to be distributed may comprise the entire video content associated with the corresponding title.

As previously described, system 100 may be configured to provide a video on demand (VOD) service to one or more user subsystems (110). A video client (120) in at least one of the one or more user subsystems (110) may be configured to access a VOD catalog (125). In some embodiments, the VOD catalog (125) may be accessed using Hypertext Transfer Protocol (HTTP) and/or another suitable protocol. The VOD catalog (125) may include information regarding one or more titles of video content that may be deliverable to the one or more user subsystems (110), e.g., on demand. In some embodiments, perhaps in addition to information that may be used (e.g., by a user) for determining the content of a title (e.g., the title's name, a short description of the title content, etc.), the VOD catalog (125) may also include information that may be used by the video client (120) and/or the terminal (130) for requesting the title, receiving the video content associated with the title, and/or processing received video content associated with the title.

In some embodiments, the video client (120) may be configured to access the VOD catalog (125) via a terminal (130) to which the video client (120) is coupled. In some embodiments, the VOD catalog (125) may be remotely stored, for example, at the hub (160), the one or more content servers (170), and/or one or more other servers (e.g., located in a computing cloud), which may be reachable via, for example, the Internet. In such embodiments, the VOD catalog (125) may be accessed via a return channel (190) configured to allow the terminal (130) to communicate with the hub (160), the one or more content servers (170), and/or the other servers, for example, via the Internet. In some embodiments, the VOD catalog (125) may be distributed and/or occasionally updated by the hub (160), for example, over the forward channel (180), and/or by the one or more content servers (170) or other servers, either via the hub (160) or directly (e.g., via the return channel (190)). Furthermore, the terminal (130) may be configured to receive the VOD catalog (125) and/or VOD catalog updates (for example, from the received forward channel (180) or the return channel (190) (e.g., the return channel may be a bi-directional channel)), store a copy of the VOD catalog (125) (e.g., in a memory of the terminal (130) or a local storage associated with the terminal), and provide the VOD catalog (125) to the video client (120) and/or allow the video client (120) to access the VOD catalog (125), e.g., upon the video client (120) requesting access to the VOD catalog (125).

A user may access the VOD catalog (125) (e.g., via the video client (120)) and may select a title (e.g., a movie, a television program, an episode from a series, etc.) from one or more titles of video content listed in the VOD catalog (125). The video client (120) may be configured to generate, upon determining that a title has been selected from the VOD catalog (125), a VOD request for the selected title and to forward the request to the terminal (130). In some embodiments, the terminal (130) may be configured to display the VOD catalog (125) using the video client (120) and to directly receive the user's selection (for example, the terminal may comprise an STB, and said selection may be performed using a control device associated with the STB (e.g., a remote control device)). The terminal (130) may be configured, upon receiving a VOD request for a title or upon determining that a title has been requested, to route the received VOD request or to generate and send a (corresponding) VOD request to the hub (160) via the return channel (190). In some embodiments, the terminal (130) may delay the sending of a VOD request for a selected title, perhaps until determining that the title prefix corresponding to the selected title may be about entirely streamed (transmitted) to the video client (120) and/or that additional content may be needed for at least the purpose of supporting continued and/or uninterrupted streaming of the selected title to the video client (120). In such embodiments, in the event that the user may decide to abandon the selected title (for example, due to finding it uninteresting), the terminal (130) may be configured to drop the VOD request associated with the selected title and may thus not send the request to the hub (160), perhaps reducing the needed capacity on the forward channel (180) by avoiding transmission in full of the abandoned selected title over the forward channel (180).

In accordance with aspects of the disclosure, upon receiving a VOD request for a title or upon determining that a title has been requested, the terminal (130) may be configured to determine if a title prefix corresponding to the requested title is stored in a local storage associated with the terminal (130), and to start streaming (transmitting) the title prefix corresponding to the requested title to the video client (120) if the title prefix is stored in the local storage. In some embodiments, the terminal (130) may be configured to, upon determining that a title prefix corresponding to the requested title is not stored in the local storage, signal the hub (160), e.g., using an indicator included in the VOD request, that a title prefix corresponding to the requested title is not stored in the local storage, hence the entire content of the title may need to be transmitted. In some embodiments, for at least the purpose of processing the title prefix and/or streaming (transmitting) the title prefix to the video client (120), the terminal (130) may be configured to use information corresponding to the selected title that may be included in the VOD catalog (125), for example, information regarding an encapsulation method (e.g., MPEG frames, IP datagrams, or the like) and/or information regarding a compression algorithm (e.g., MPEG-2, MPEG-4, etc.) that may be associated with the selected title.

Upon sending to the hub (160) a VOD request, e.g., for a selected title, the terminal (130) may be configured to apply to the received forward channel (180) one or more filters corresponding to the selected title, for at least the purpose of receiving one or more multicast transmissions including video content associated with the selected title. In some embodiments, the terminal (130) may be configured to filter and receive each of the multicast transmissions associated with the selected title. Thus, the terminal (130) may be configured to simultaneously receive a plurality of segments of video content associated with the selected title. In some embodiments, the terminal (130) may be configured to determine the necessary parameters for the one or more filters in accordance with information corresponding to the requested title that may be included in the VOD catalog (125), for example, a stream identifier, a program identifier (PID), a multicast identifier, etc. The terminal (130) may be configured to, upon receiving content associated with the selected title, store the received content in a local storage associated with the terminal (130), process the received content in accordance with one or more properties of the selected title (for example, encapsulation, compression, etc.) and stream (transmit) the processed content to the video client (120) in accordance with one or more formats, protocols, and/or interfaces that the video client (120) and/or the terminal (130) may be configured to support. In some embodiments, the terminal (130) may be configured to start streaming the processed content that may be derived from the received content about immediately after all of the title prefix associated with the selected title has been streamed to the video client (120).

As previously described, the hub (160) may be configured to divide video content associated with a title (that may be deliverable on demand) into one or more segments of video content (e.g., for the purpose of generating a title prefix corresponding to the title). In addition, the hub (160) may be configured to receive one or more VOD requests (e.g., from one or more terminals (130) associated with the one or more user subsystems (110)), e.g., via the return channel (190). The hub (160) may be configured to, upon receiving a VOD request for a selected title (that may be deliverable on demand), determine which of the one or more segments (if any) of video content associated with the selected title to transmit over the forward channel (180). In some embodiments, the hub (160) may be configured to not transmit one or more segments that may be included in a title prefix associated with the selected title, if a title prefix associated with the selected title has been generated and distributed (e.g., since segments of video content included in the title prefix may already be stored in a local storage associated with the requesting terminal (130)). In some embodiments, the requesting terminal (130) may be configured to signal the hub (160) that a title prefix associated with the selected title is not stored in a local storage associated with the terminal (130), and the hub (160) may be configured to determine that such a signal exists in the received VOD request and to transmit the one or more segments that may be included in a title prefix associated with the selected title.

The hub (160) may be further configured to transmit the determined segments (if any) using one or more multicast transmissions and in accordance with one or more identifiers that may be associated with the selected title (e.g., in accordance with the VOD catalog (125)), for example, at least one stream identifier, program identifier (PID), multicast identifier, etc.

Figure 2:
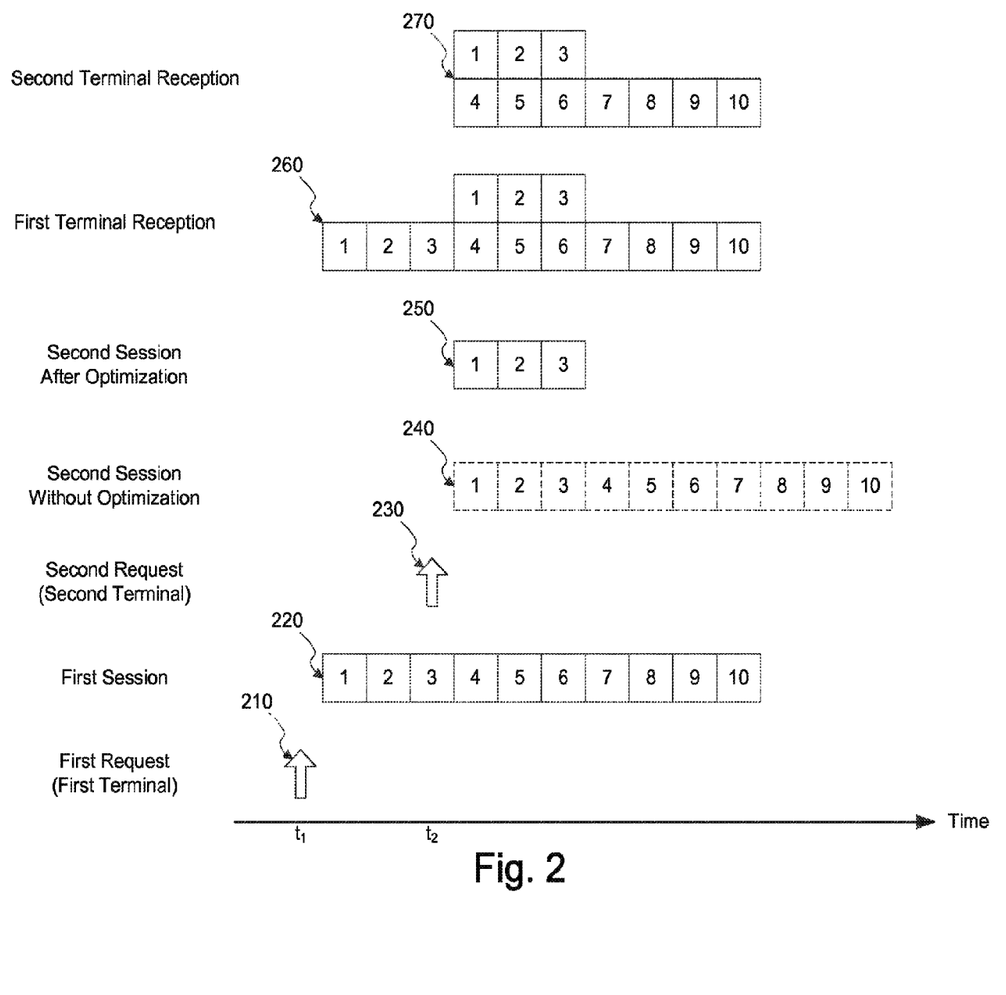
FIG. 2 shows an example of content distribution in accordance with one or more aspects of the disclosure.

In accordance with aspects of the disclosure, the hub (160) may be configured to determine, upon receiving a VOD request for a selected title, whether the selected title has already been requested (e.g., by another user subsystem (110)). The hub (160) may be configured to, upon determining that the selected title has already been requested, modify a previous determination of which segments of video content associated with the selected title to transmit, and transmit segments of video content associated with the selected title in accordance with the modified determination. FIG. 2 shows an example of such a process.

In reference to FIG. 2, the hub (160) may receive a first request (210) for a selected title at a first time (e.g., $t_1$). In some embodiments, the first request may be received, e.g., via the return channel (190), from a first terminal (130) of the one or more terminals (130) associated with the one or more user subsystems (110). Upon receiving the first request (210), the hub (160) may be configured to determine one or more segments of video content that may be associated with the selected title (e.g., segments 1 to 10) and to start transmitting a first session (220) that may include the determined one or more segments of video content. The hub (160) may receive a second request (230) for the selected title at a second time (e.g., $t_2$). In some embodiments, the second request may be received, e.g., via the return channel (190), from a second terminal (130) of the one or more terminals (130) associated with the one or more user subsystems (110). As shown in FIG. 2, the second request (230) may be received while the first session (220) of transmitting segments of video content associated with the selected title is still be in progress. For example, FIG. 2 shows the second request (230) for the selected title being received while segment 3 of the video content (e.g., video content associated with the selected title) is in the process of being transmitted as part of the first session (220).

In regular VOD distribution systems, responding to the second request for the selected title may result in a non-optimized second session (240) that may include transmission of each of the one or more segments of video content associated with the selected title (e.g., segments 1 to 10), for example, like in the first session. In system 100, however, since the segments of video content associated with the selected title may be transmitted using one or more multicast transmissions (e.g., over the forward channel (180)) and since the forward channel (180) and the one or more multicast transmissions may be received both by the first terminal and by the second terminal, segments of video content included in the first session that have not yet been transmitted may be received by the second terminal as well as by the first terminal. Thus, hub (160) may be configured to optimize the second session (250) at least in accordance with a progress condition of the first session (220), for example, at the time of receiving the second request (230) for the selected title. It may be noted that such optimization may reduce the amount of bandwidth needed for transmitting at least the second session.

The hub (160) may be configured to, upon receiving the second request (230) for the selected title (e.g., at $t_2$), determine that a first session that includes segments of video content associated with the selected title is in progress, determine that some segments of the one or more segments of video content included in the first session have already been transmitted either entirely or in part (e.g., segments 1 to 3), and include in the optimized second session (250) at least the segments of video content that have already been transmitted (either entirely or in part) in the first session (e.g., the optimized second session (250) may include segments 1 to 3), e.g., since the second terminal (130) may not receive these segments of video content through the first session (220).

The second terminal (130) to request the selected title may receive (230) each of the segments of video content (e.g., segments 1 to 10) associated with the selected title, wherein some of the segments of video content may be received as part of the first session (e.g., segments 4 to 10), while other segments of the video content may be received as part of the second session (e.g., segments 1 to 3), and the additional bandwidth (capacity) that may be needed for servicing the request of the second terminal (130) may thus be reduced.

The first terminal (130) to request the selected title may receive (260) segments of video content transmitted in the first session (220) and segments of video content transmitted in the second session (250). But while the first terminal (130) may receive each of the segments of video content associated with the selected title, the first terminal (130) may receive one or more segments of the video content more than once. Thus, the one or more terminals (130) associated with the one or more user subsystems (110), as well as the first terminal (130), may be configured to determine for each received segment of video content whether the received segment of video content is a duplicate of a segment of video content previously received and/or a duplicate of a segment of video content that may be stored in a local storage associated with the terminal (130). The one or more terminals (130) may be configured to store a received segment of video content if the received segment of video content is not a duplicate of a previously received and/or stored segment of video content, and/or to discard a received segment of video content if the received segment of video content is a duplicate of a previously received and/or stored segment of video content.

In accordance with aspects of the disclosure, the hub (160) may be configured to maintain a segments map corresponding to at least one selected title. The segments map may comprise at least a transmission start time descriptor for each instance of a segment of video content included in one or more transmission sessions associated with the at least one selected title that may be in progress (e.g., 220 and 250). In some embodiments, the hub (160) may be configured to maintain a segments map for each requested (selected) title associated with at least one transmission session in progress. In some embodiments, the hub (160) may be configured to maintain a segments map for each title that may be requested, e.g., on demand.

The hub (160) may be configured, upon receiving a new request for the at least one selected title, to determine, in accordance with a segments map corresponding to the at least one selected title, which segments of video content (e.g., which of segments 1 to 10) associated with the at least one selected title may no longer be transmitted in any of one or more transmission sessions already in progress and associated with the at least one selected title. The hub (160) may be further configured to, upon so determining, generate a new transmission session associated with the at least one selected title, wherein the newly generated transmission session may include said determined segments of video content. The hub (160) may be further configured to update the segments map associated with the at least one selected title in accordance with the newly generated transmission session.

Figure 3:
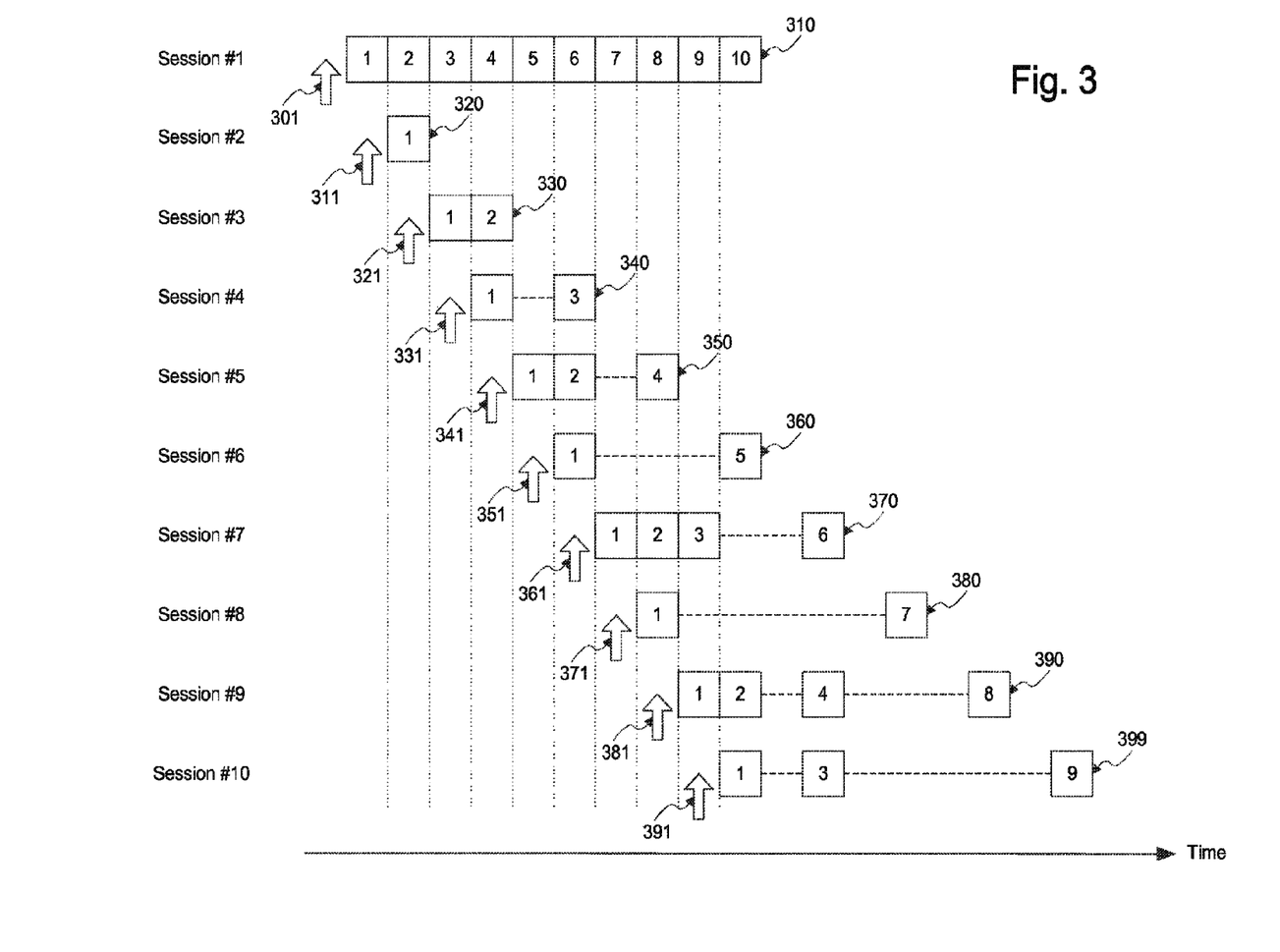
FIG. 3 shows another example of content distribution in accordance with one or more aspects of the disclosure.

In some embodiments, hub (160) may be configured to set the transmission start time of each segment of video content associated with the at least one selected title as late as possible, e.g., to delay the transmission of segments of video content as much as possible. The hub (160) may be configured to transmit at least one segment of video content to be received by a corresponding terminal (130) at about the latest time sufficient for streaming the content included in the at least one segment of video content, e.g., just in time for the corresponding terminal (130) to stream (transmit) the video content that may be included in the respective segment of video content to the corresponding video client (120) without affecting the end user's viewing experience. FIG. 3 shows a graphic depiction of an example segments map corresponding to a selected title requested by a plurality of terminals (130) at a plurality of times.

The hub (160) may be configured to, upon receiving a first request for the selected title (301), determine that no transmission session associated with the selected title is in progress, generate a first transmission session (310) that includes each of the segments of video content associated with the selected title (except maybe for segments associated with a title prefix corresponding to the selected title), and transmit each segment of video content included in the first transmission session (e.g., segments 1 to 10) in accordance with the latest start time corresponding to each segment (for example, in accordance with the play time of each segment).

Once transmission of the first session (310) is in progress (e.g., the transmission start time associated with segment 1 included in the first transmission session may have passed), the hub (160) may be configured to, upon receiving a subsequent request for the selected title (e.g., any of 311, 321, 331, etc. until 391), determine that one or more transmission sessions associated with the selected title is in progress (e.g. any of 310, 320, 330, etc. until 390), determine which segments of video content (e.g., which of segments 1 to 10) may no longer be transmitted in the one or more transmission sessions in progress, and generate a new transmission session associated with the selected title (e.g., any of 320, 330, 340, etc. until 390 and 399, respectively), wherein the newly generated transmission session may include only the segments of video content that may no longer be transmitted in the previously existing one or more transmission sessions in progress (e.g., any of 310, 320, 330, etc. until 390).

For example, the hub (160) may be configured to, upon receiving the fourth request for the selected title (331), determine that two transmission session associated with the selected title (e.g., 310 and 330) are in progress (e.g., the second session 320 may start and end before the fourth request (331) may be received), determine that only segments 1 and 3 may no longer be transmitted in the transmission sessions already in progress, and generate a fourth transmission session (340) associated with the selected title, wherein the fourth transmission session may include only segments 1 and 3 (e.g., segment 2 may be received in the third transmission session 330, e.g., simultaneously to receiving segment 1 in the fourth transmission session (340) and to receiving segment 4 in the first transmission session (310)).

In another example, the hub (160) may be configured to, upon receiving the ninth request for the selected title (381), determine that four transmission sessions associated with the selected title (310, 360, 370 and 380) may be in progress (e.g., transmission sessions 320, 330, 340 and 350 may start and end before the ninth request (381) may be received), determine that only segments 1, 2, 4 and 8 may no longer be transmitted in the transmission sessions already in progress and, generate a ninth transmission session (390) associated with the selected title, wherein the ninth transmission session may include only segments 1, 2, 4 and 8 (e.g., segment 3 may be received in the seventh transmission session 370, e.g., simultaneously to receiving segment 1 in the ninth transmission session (390) and to receiving segment 9 in the first transmission session (310); segment 5 may be received in the sixth transmission session (360), e.g., simultaneously to receiving segment 2 in the ninth transmission session (390) and to receiving segment 10 in the first transmission session (310); segment 6 may be received in the seventh transmission session (370), e.g., simultaneously to receiving segment 4 in the ninth transmission session (390); and segment 7 may be received in the eighth transmission session (380)).

As previously mentioned, in regular VOD distribution systems, each request for a selected title may result in transmitting all segments of video content associated with the selected title. Hence, if the scenario shown in FIG. 3 were applied to a regular VOD distribution system (e.g., 10 requests for a title associated with 10 segments of video content), the regular VOD distribution system may have transmitted 100 segments of video content. In contrast, as shown in FIG. 3, system 100 may respond to the scenario by transmitting only 33 segments of video content. While both a regular VOD distribution system and system 100 may fully serve all requests, system 100 may utilize significantly less bandwidth (capacity), e.g., over the satellite (140), in doing so.

Moreover, while in a regular VOD distribution system the needed bandwidth (capacity) may correspond to the number of simultaneous requests, in system 100, the needed bandwidth (capacity) may correspond to the number of titles that may be simultaneously distributed. While there may be a need to simultaneously distribute (e.g., on demand) several thousands of titles (e.g., for at least the purpose of providing very good user experience), the number of simultaneous users may be in the many millions and the number of simultaneous requests may be in the millions as well. Thus, system 100 may be configured to deliver on-demand video content to practically any number of users without significantly increasing the needed bandwidth (capacity) to do so.

In accordance with aspects of the disclosure, the hub (e.g., 160) may be configured to distribute video content on demand using Internet Protocol (IP) datagrams or MPEG frames. In some embodiments, wherein the hub (e.g., 160) may be configured to distribute video content on demand over IP datagrams, video content may be efficiently streamed and on-demand video content may be received by standard IP video clients with little or perhaps no modifications to these video clients. In some embodiments, wherein the hub (e.g., 160) may be configured to distribute video content using MPEG frames and wherein linear channels may also be transmitted over the satellite (e.g., 140) and received using MPEG streams, a set-top-box (STB) configured for receiving linear channels may be easily (re)configured to support delivery of on-demand video content. A STB configured for receiving linear channels (e.g., DTH) may be configured to receive MPEG frames associated with a linear channel and to forward the received MPEG frames to a coupled video client. In order to support delivery of video content on demand, the STB may be configured, upon receiving MPEG frames associated with on-demand video content, to store (e.g., in a local storage) the received MPEG frames associated with the on-demand video content instead of immediately streaming the received MPEG frames (associated with the on-demand video content) to the video client. The STB may be further configured to restore (retrieve) (e.g., from the local storage) the stored MPEG frames associated with the on-demand video content at a later time and to forward the restored (retrieved) MPEG frames to the video client.

In accordance with aspects of the disclosure, system 100 may further comprise, e.g., in addition to the one or more user subsystems (110) previously described, at least one other user subsystem, wherein the at least one other user subsystem may comprise a terminal that may be configured to receive the forward channel (180) but not to transmit over at least the return channel (190). Thus, the terminal of the at least one other user subsystem may not be able to transmit at least one VOD request to the hub (160) and/or the one or more content servers (170).

The terminal of the at least one other user subsystem may be configured to receive one or more multicast transmissions (e.g., over the forward channel (180)), to extract one or more title prefixes included in the one or more multicast transmissions, and to store the extracted one or more title prefixes in a local storage associated with the terminal. Furthermore, the terminal of the at least one other user subsystem may be configured to receive a VOD catalog (125) and/or VOD catalog updates (for example, over the forward channel (180)), and to store a copy of the VOD catalog (125) in a memory associated with the terminal. In addition, a video client (120) may be coupled to the terminal of the at least one other user subsystem and the terminal may be configured to transmit the VOD catalog (125) to the video client (120) and/or to allow the video client (120) to access the VOD catalog (125), e.g., upon the video client (120) requesting access to the VOD catalog (125). In some embodiments, the terminal of the at least one other user subsystem may be configured to transmit the VOD catalog and/or to allow the video client (120) to access the VOD catalog (125) using Hypertext Transfer Protocol (HTTP), and/or another suitable protocol.

The terminal of the at least one other user subsystem may not be able to transmit (e.g., to the hub (160)) a request for a title. The terminal, however, may be configured to receive multicast transmissions (e.g., over the forward channel (180)) including segments of video content that may be associated with titles that may be selected by any of the one or more user subsystems (110). The terminal of the at least one other user subsystem may be configured to receive (e.g., from the video client (120)) a VOD request for a selected title and/or to determine that a title has been requested (e.g., by the video client (120)) and to apply to the received forward channel (180) one or more filters corresponding to the selected title. The terminal of the at least one other user subsystem may be configured to apply the said one or more filters for at least the purpose of receiving one or more multicast transmissions including segments of video content associated with the selected title, if and when the said one or more multicast transmissions may be transmitted, for example, in response to a request for the same selected title by a user subsystem of the one or more user subsystems (110). In some embodiments, the terminal of the at least one other user subsystem may be configured to determine the necessary parameters for the one or more filters in accordance with information corresponding to the selected title that may be included in the VOD catalog (125), for example, a stream identifier, program identifier (PID), multicast identifier, etc. The terminal of the at least one other user subsystem may be configured, upon receiving segments of video content associated with the selected title, to store the received segments of video content in a local storage associated with the terminal, process the received segments of video content in accordance with one or more properties of the selected title (for example, encapsulation, compression, etc.), and stream (transmit) the processed video content to the video client (120), for example, in accordance with one or more formats, protocols and/or interfaces that the video client (120) and/or the terminal of the at least one other user subsystem may be configured to support.

Since the terminal of the at least one other user subsystem may not be able to transmit (e.g., to the hub (160)) any request for any title, it may be impossible for the terminal of the at least one other user subsystem to determine when video content of a selected title may be received and/or available for streaming, if at all. Thus, the terminal may be configured to, upon receiving a VOD request for a selected title and/or determining that a title has been requested, not start streaming (e.g., to the video client (120)) any title prefix that may correspond to the selected title, even if the terminal has a title prefix corresponding to the selected title stored in its associated local storage. In some embodiments, the terminal of the at least one other user subsystem may be configured to start streaming (transmitting) a title prefix corresponding to the selected title (e.g., to the video client (120)) upon starting to receive further segments of video content associated with the selected title (e.g., segments of video content associated with the selected title that may not be included in the title prefix corresponding to the selected title), for example, upon determining that further segments of video content associated with the selected title may be obtained. The terminal of the at least one other user subsystem may be configured to start streaming (transmitting) the further segments of video content that may be associated with the selected title about immediately after all of the title prefix associated with the selected title has been streamed, e.g., to the video client (120).

In some embodiments, the terminal of the at least one other user subsystem may be configured to store the received further segments of video content associated with the selected title in a local storage associated with the terminal, and to send an indication to the video client (120) when the title may be available for streaming. In some embodiments, the terminal of the at least one other user subsystem may be configured to include in and/or add to the VOD catalog (120) a list of titles that may be available for streaming. The terminal of the at least one other user subsystem may be configured to start streaming video content associated with a selected title upon receiving a further request, e.g., from the video client (120), to start streaming the video content associated with the selected title. In some embodiments, the terminal of the at least one other user subsystem may be configured to send an indication to the video client (120) that a selected title may be available for streaming and/or to add the selected title to the list of titles that may be available for streaming upon receiving and/or storing a first segment of video content of the further segments of video content associated with the selected title. In some embodiments, the terminal of the at least one other user subsystem may be configured to send an indication to the video client (120) that a selected title may be available for streaming and/or to add the selected title to the list of titles available for streaming upon all the segments of video content associated with the selected title being stored in its associated local storage.

It may be noted that system 100 may comprise any number of other user subsystems, e.g., similar to the at least one other user subsystem described above, without needing any additional capacity (bandwidth), for either the forward channel (180) or the return channel (190), as these other user subsystems may be configured not to increase the usage of capacity in the forward channel (180) and in the return channel (190). Thus, a video distribution service that may be provided using such other user subsystems may be offered at relatively low prices to a practically unlimited number of users. In addition, while the type of service that may be provided by such other user subsystems might not be considered Video on Demand (VOD) per se (e.g., since the time for delivering a selected title may be relatively long (e.g., hours, days, or longer, if at all)), such service may still allow users of such other user subsystems to receive and view at least the most popular titles, as the probability of such titles being requested by any of the one or more user subsystems (110) may be very high.

It should be appreciated by those skilled in the art that though the above disclosure may refer to a system and methods for delivery of video content on demand, other types of content may be delivered using similar systems and methods without departing from the current disclosure. Furthermore, it should also be appreciated that though the above disclosure may refer to a satellite communication system, the methods disclosed herein may be used in similar manner in other types of wireless communications systems, as well as wired communication systems.

Various aspects of the disclosure may be embodied as one or more methods, systems, apparatuses (e.g., components of a satellite communication network), and/or computer program products. Accordingly, those aspects may take the form of an entirely hardware embodiment, an entirely software embodiment, an entirely firmware embodiment, or an embodiment combining firmware, software, and/or hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In some embodiments, one or more computer readable media storing instructions may be used. The instructions, when executed, may cause one or more apparatuses to perform one or more acts described herein. The one or more computer readable media may comprise transitory and/or non-transitory media. In addition, various signals representing data or events as described herein may be transferred between a source and a destination in the form of electromagnetic waves traveling through signal-conducting media such as metal wires, optical fibers, and/or wireless transmission media (e.g., air and/or space).

Modifications may be made to the various embodiments described herein by those skilled in the art. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. A system, comprising:
  a plurality of apparatuses of a first type; and
  an apparatus of a second type configured to:
    divide content stored in a content server into a plurality of segments;
    generate a title prefix comprising a first set of one or more segments, of the plurality of segments;
    transmit one or more multicast transmissions comprising the title prefix to one or more apparatuses of the plurality of apparatuses of the first type;
    receive, from a first apparatus of the first type of the plurality of apparatuses of the first type, a request for the content;
    determine, based on the request, a second set of one or more segments, of the plurality of segments, to be transmitted;
    initiate, in a transmission session comprising one or more subsequent multicast transmissions, transmission of the second set of one or more segments to a portion of the plurality of apparatuses of the first type comprising the first apparatus of the first type; and
    delay, during the transmission session comprising one or more subsequent multicast transmissions, transmission of at least one segment of the second set of one or more segments until a time determined to be sufficient for the first apparatus of the first type to receive the at least one segment of the second set of one or more segments without affecting streaming of the content by the first apparatus of the first type.

2. The system of claim 1, wherein the apparatus of the second type is further configured to, responsive to receiving from a different apparatus of the first type of the plurality of apparatuses of the first type, a subsequent request for the content:
  determine that the transmission session is in progress; and
  responsive to a determination that a portion of the second set of one or more segments were already transmitted to the portion of the plurality of apparatuses of the first type comprising the first apparatus of the first type, transmit, in a subsequent transmission session comprising one or more multicast transmissions, the portion of the second set of one or more segments to a portion of the plurality of apparatuses of the first type comprising the different apparatus of the first type.

3. The system of claim 1, wherein the first apparatus of the first type is configured to:
receive the one or more multicast transmissions comprising the title prefix;
extract the title prefix comprising the first set of one or more segments from the one or more multicast transmissions comprising the title prefix;
store the first set of one or more segments in a storage; and
responsive to a determination that a client device has requested the content and a determination that the title prefix is stored in the storage:
stream the first set of one or more segments from the storage to the client device;
transmit the request for the content;
receive the one or more subsequent multicast transmissions comprising the second set of one or more segments;
extract the second set of one or more segments from the one or more subsequent multicast transmissions comprising the second set of one or more segments;
store the second set of one or more segments in the storage; and
stream the second set of one or more segments from the storage to the client device.

4. The system of claim 1, wherein at least one of the one or more subsequent multicast transmissions comprising the second set of one or more segments comprises a first subset of one or more segments of the content included in one or more multicast transmissions previously transmitted by the apparatus of the second type, and wherein the first apparatus of the first type is configured to identify and discard the first subset of one or more segments of the content included in the one or more multicast transmissions previously transmitted by the apparatus of the second type.

5. The system of claim 1, wherein the plurality of apparatuses of the first type comprises a second apparatus of the first type not associated with the request for the content and configured to:
receive the one or more multicast transmissions comprising the title prefix;
receive the one or more subsequent multicast transmissions comprising the second set of one or more segments;
extract the title prefix comprising the first set of one or more segments from the one or more multicast transmissions comprising the title prefix;
extract the second set of one or more segments from the one or more subsequent multicast transmissions comprising the second set of one or more segments;
store the first set of one or more segments and the second set of one or more segments in a storage; and
responsive to a determination that a client device has requested the content and a determination that the title prefix is stored in the storage, stream the first set of one or more segments and the second set of one or more segments from the storage to the client device.

6. The system of claim 5, wherein the second apparatus of the first type and not associated with the request for the content is configured to stream the first set of one or more segments and the second set of one or more segments from the storage to the client device in response to at least one of extracting a portion of the second set of one or more segments from the one or more subsequent multicast transmissions comprising the second set of one or more segments or storing a portion of the second set of one or more segments in the storage.

7. The system of claim 5, wherein the second apparatus of the first type and not associated with the request for the content is configured to send, to the client device and responsive to at least one of extracting a portion of the second set of one or more segments from the one or more subsequent multicast transmissions comprising the second set of one or more segments or storing a portion of the second set of one or more segments in the storage, an indication that the content is available for streaming.

8. The system of claim 1, wherein each of the plurality of apparatuses of the first type is a terminal and the apparatus of the second type is a hub.

9. The system of claim 1, wherein the content is associated with a title, the apparatus of the second type further configured to:
determine a length property for the title prefix comprising the first set of one or more segments based on at least one of a length property associated with the title, a cost of storing a title prefix of a predefined length in a storage, or a cost figure corresponding to a cost of an estimated amount of bandwidth needed for transmitting a title prefix of a predefined length; and
generate, in accordance with the length property for the title prefix comprising the first set of one or more segments, the title prefix comprising the first set of one or more segments.

10. The system of claim 1, wherein the content comprises video content, and wherein the apparatus of the second type is configured to transmit, via a communication interface, at least one of Moving Picture Experts Group (MPEG) frames comprising any of the first set of one or more segments or the second set of one or more segments or Internet Protocol (IP) datagrams comprising any of the first set of one or more segments or the second set of one or more segments.

11. The system of claim 1, the first apparatus of the first type further configured to:
generate a second request for one or more additional segments of the content; and
after streaming a first portion of the first set of one or more segments to a client device, prior to streaming a second portion of the first set of one or more segments to the client device, and responsive to a determination that the one or more additional segments will not be streamed to the client device, cancel the second request for the one or more additional segments.

12. The system of claim 1, the first apparatus of the first type further configured to:
receive a subsequent request for second content;
responsive to a determination that a title prefix corresponding to the second content is not stored in a storage, transmit, to the apparatus of the second type, a second request for the second content, the second request indicating that each segment of the second content should be transmitted via one or more second multicast transmissions to a second portion of the plurality of apparatuses of the first type comprising the first apparatus of the first type.

* * * * *